(12) United States Patent
Okutani et al.

(10) Patent No.: US 6,768,862 B1
(45) Date of Patent: Jul. 27, 2004

(54) RETRIEVAL METHOD AND RETRIEVAL DEVICE BY DESIGNATION OF RECORDING TIME IN IMAGE RECORDING/REPRODUCING APPARATUS

(75) Inventors: Ayumu Okutani, Kashihara (JP); Yoshiaki Maida, Shijyonawate (JP); Kazunori Miyata, Neyagawa (JP)

(73) Assignee: Sanyo Electric Co., Ltd., Osaka (JP)

( * ) Notice: Subject to any disclaimer, the term of this patent is extended or adjusted under 35 U.S.C. 154(b) by 0 days.

(21) Appl. No.: 09/539,522

(22) Filed: Mar. 30, 2000

(30) Foreign Application Priority Data

Mar. 31, 1999 (JP) ............................................ 11-092533

(51) Int. Cl.$^7$ ............................ H04N 5/76; H04N 5/783
(52) U.S. Cl. ...................................... 386/69; 360/72.2
(58) Field of Search ............................. 386/1, 6–8, 68, 386/81, 69; 360/72.1, 72.2, 73.12, 73.13; H04N 5/76, 5/781, 5/783

(56) References Cited

U.S. PATENT DOCUMENTS

| 5,493,455 A | * | 2/1996 | Miyoshi et al. ............... 360/60 |
| 6,341,047 B1 | * | 1/2002 | Ishii et al. .................. 360/72.2 |
| 6,504,991 B1 | * | 1/2003 | Higurashi et al. ............. 386/67 |
| 6,636,688 B1 | * | 10/2003 | Otana ........................... 386/83 |
| 2001/0016109 A1 | * | 8/2001 | Okutani et al. ............... 386/68 |
| 2001/0021304 A1 | * | 9/2001 | Link et al. ..................... 386/46 |

FOREIGN PATENT DOCUMENTS

| JP | 05344494 a | 12/1993 |
| JP | 07274105 a | 10/1995 |
| JP | 11039845 a | 2/1999 |

* cited by examiner

*Primary Examiner*—Thai Tran
(74) *Attorney, Agent, or Firm*—Arent Fox, PLLC

(57) ABSTRACT

A retrieval method by designation of recording time comprises the first step of specifying, when recording time is designated in order to perform retrieval by designation of the recording time, a block corresponding to the designated recording time on the basis of VASS data, and storing in a second memory data in the block, the second step of retrieving, out of a plurality of fields included in the block stored in the second memory, the field having recording time information corresponding to the designated recording time by binary search, and the third step of reproducing and outputting data corresponding to the retrieved field.

6 Claims, 10 Drawing Sheets

FIG. 7

| INDEX | ADDRESS IN WHICH FRAME HEADER IS STORED |
|---|---|
| 1 | xxxxh |
| 2 | xxxxh |
| 3 | xxxxh |
| 4 | xxxxh |
|  | xxxxh |
|  | xxxxh |
|  | xxxxh |
|  | xxxxh |
|  | xxxxh |
|  | xxxxh |
| 2024 | xxxxh |

FIG. 9

| INDEX NUMBER IN SUB-BANK | STORED DATA |
|---|---|
| 1 | I1 |
| 2 | P11 |
| 3 | P12 |
| 4 | P13 |
| 5 | I2 |
| 6 | P21 |
| 7 | P22 |
| 8 | P23 |
| 9 | I3 |
| 10 | P31 |
| 11 | P32 |
| 12 | P33 |

RETRIEVAL METHOD AND RETRIEVAL DEVICE BY DESIGNATION OF RECORDING TIME IN IMAGE RECORDING/REPRODUCING APPARATUS

BACKGROUND OF THE INVENTION

1. Field of the Invention

The present invention relates to a retrieval method and a retrieval device by designation of recording time in an image recording/reproducing apparatus.

2. Description of the Prior Art

An image recording/reproducing apparatus for recording on a video tape an image picked up by a monitoring camera or its compressed data for each predetermined block, and reading and reproducing the data recorded on the video tape for each predetermined block has already been developed.

Such an image recording/reproducing apparatus is convenient if it can reproduce and output, by designating recording time, an image recorded at the designated recording time.

SUMMARY OF THE INVENTION

An object of the present invention is to provide, in an image recording/reproducing apparatus capable of reproducing and outputting, by designating recording time, an image recorded at the designated recording time, a retrieval method and a retrieval device by the designation of the recording time.

A retrieval method by designation of recording time in a first image recording/reproducing apparatus according to the present invention is a retrieval method by designation of recording time in an image recording/reproducing apparatus for recording, at the time of recording, input image data or its compressed data on a video tape by adding recording time information for each block including data corresponding to a plurality of fields and for each field included in the block as well as recording for each block VASS data representing the recording time information at the head of the block on a control track of the video tape, characterized by comprising the first step of specifying, when recording time is designated in order to perform retrieval by designation of the recording time, a block corresponding to the designated recording time on the basis of the VASS data, and storing in a second memory data in the block; the second step of retrieving, out of the plurality of fields included in the block stored in the second memory, the field having the recording time information corresponding to the designated recording time by binary search; and the third step of reproducing and outputting the data corresponding to the retrieved field.

A retrieval device by designation of recording time in a first image recording/reproducing apparatus according to the present invention is a retrieval device by designation of recording time in an image recording/reproducing apparatus for recording, at the time of recording, input image data or its compressed data on a video tape by adding recording time information for each block including data corresponding to a plurality of fields and for each field included in the block as well as recording for the block VASS data representing the recording time information at the head of the block on a control track of the video tape, characterized by comprising first means for specifying, when recording time is designated in order to perform retrieval by designation of the recording time, a block corresponding to the designated recording time on the basis of the VASS data, and storing in a second memory data in the block; second means for retrieving, out of the plurality of fields included in the block stored in the second memory, the field having recording time information corresponding to the designated recording time by binary search; and third means for reproducing and outputting the data corresponding to the retrieved field.

A retrieval method by designation of recording time in a second image recording/reproducing apparatus according to the present invention is a retrieval method by designation of recording time in an image recording/reproducing apparatus for storing, at the time of recording, input image data as basic image data in a first memory in a period of a predetermined number of fields, finding, with respect to each of the input image data corresponding to the fields between the field corresponding to the input image data which has been stored in the first memory and the field corresponding to the input image data which is to be subsequently stored in the first memory, the difference between the input image data and the basic image data which has been most newly stored in the first memory to produce difference data, recording on a video tape the basic image data and the difference data or their compressed data by adding, for each block including data corresponding to the plurality of fields and for each field included in the block, identification information indicating whether the field corresponds to the basic image data or the difference data and recording time information, and recording for each block VASS data representing the recording time information at the head of the block on a control track of the video tape, characterized by comprising the first step of specifying, when recording time is designated in order to perform retrieval by designation of the recording time, the block corresponding to the designated recording time on the basis of the VASS data, and storing in a second memory data in the block; the second step of retrieving, out of the plurality of fields included in the block stored in the second memory, the field having the recording time information corresponding to the designated recording time by binary search; the third step of reproducing and outputting, when the retrieved field corresponds to the basic image data, the field; and the fourth step of reproducing and outputting, when the retrieved field corresponds to the difference data, the field, corresponding to the basic image data, close to the field retrieved in the block specified at the first step.

An example of the fourth step is one comprising the steps of judging, when the retrieved field corresponds to the difference data, whether the field exists in the first half or the latter half of the block specified at the first step, reproducing and outputting, when it is judged that the retrieved field exists in the first half of the block specified at the first step, the field, corresponding to the basic image data, closest to the field retrieved out of the fields recorded after the retrieved field has been recorded, and reproducing and outputting, when it is judged that the retrieved field exists in the latter half of the block specified at the first step, the field, corresponding to the basic image data, closest to the retrieved field out of the fields recorded before the retrieved field has been recorded.

A retrieval device by designation of recording time in a second image recording/reproducing apparatus according to the present invention is a retrieval device by designation of recording time in an image recording/reproducing apparatus for storing, at the time of recording, input image data as basic image data in a first memory in a period of a predetermined number of fields, finding, with respect to each of the input image data corresponding to the fields between the field corresponding to the input image data which has been stored in the first memory and the field corresponding to the input image data which is to be subsequently stored in the first memory, the difference between the input image data and the basic image data which has been most newly stored in the first memory to produce difference data, recording on a video tape the basic image data and the difference data or their compressed data by adding, for each block including data corresponding to the plurality of fields and for each field included in the block, identification information indicating whether the field corresponds to the basic image data or the difference data and recording time information, and recording for each block VASS data representing the recording time information at the head of the block on a control track of the video tape, characterized by comprising first means for specifying, when recording time is designated in order to perform retrieval by designation of the recording time, the block corresponding to the designated recording time on the basis of the VASS data, and storing in a second memory data in the block; second means for retrieving, out of the plurality of fields included in the block stored in the second memory, the field having the recording time information corresponding to the designated recording time by binary search; third means for reproducing and outputting, when the retrieved field corresponds to the basic image data, the field; and fourth means for reproducing and outputting, when the retrieved field corresponds to the difference data, the field, corresponding to the basic image data, close to the field retrieved in the block specified by the first means.

An example of the fourth means is one comprising means for judging, when the retrieved field corresponds to the difference data, whether the field exists in the first half or the latter half of the block specified by the first means, means for reproducing and outputting, when it is judged that the retrieved field exists in the first half of the block specified by the first means, the field, corresponding to the basic image data, closest to the field retrieved out of the fields recorded after the retrieved field has been recorded, and means for reproducing and outputting, when it is judged that the retrieved field exists in the latter half of the block specified by the first means, the field, corresponding to the basic image data, closest to the retrieved field out of the fields recorded before the retrieved field has been recorded.

The foregoing and other objects, features, aspects and advantages of the present invention will become more apparent from the following detailed description of the present invention when taken in conjunction with the accompanying drawings.

BRIEF DESCRIPTION OF THE DRAWINGS

FIG. 7 is a schematic view showing the contents of a sub-bank;

FIG. 9 is a schematic view showing data which have been normally reproduced out of data in one block which have been normally reproduced immediately before the time point where a reverse play command is entered and index numbers corresponding thereto.

DETAILED DESCRIPTION OF THE PREFERRED EMBODIMENTS

Figure 1:
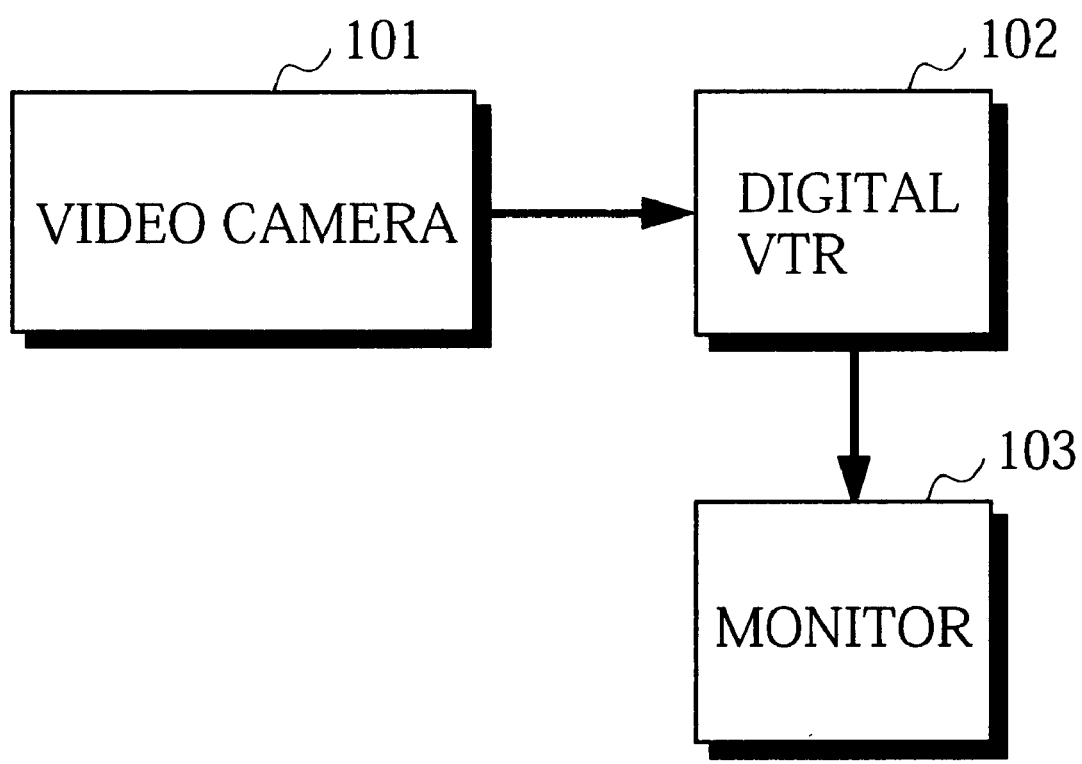
FIG. 1 is a block diagram showing the configuration of a monitoring system.

Referring now to the drawings, description is made of an embodiment in a case where the present invention is applied to a digital VTR for recording and reproducing an image picked up by a monitoring camera.

[1] Description of Overall Configuration of Monitoring System

FIG. 1 illustrates the overall configuration of a monitoring system.

The monitoring system comprises a video camera (hereinafter referred to as a monitoring camera) 101, a digital VTR 102 for compressing and recording an image signal obtained by the monitoring camera 101, and a monitor 103 for displaying an image reproduced by the digital VTR 102.

[2] Description of Operation at the Time of Recording of Image Signal Processing Circuit in Digital VTR 102

Figure 2:
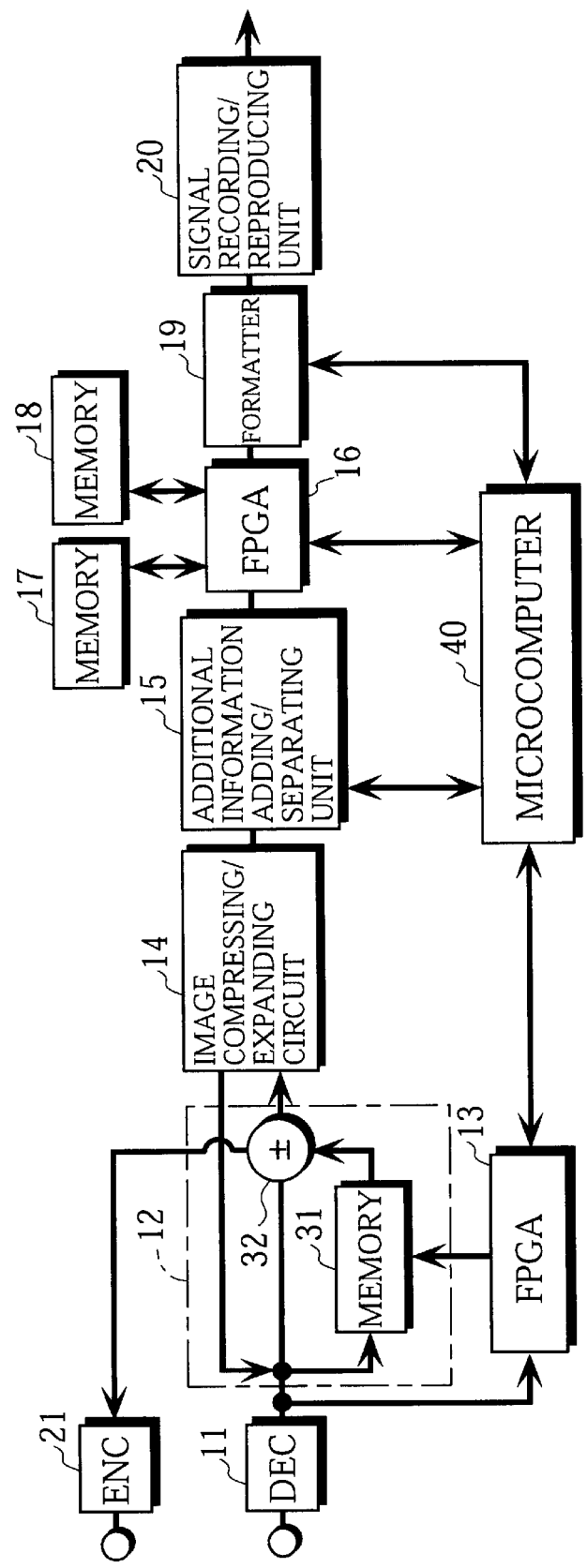
FIG. 2 is a block diagram showing the schematic configuration of a digital VTR.

FIG. 2 illustrates the configuration of an image signal processing circuit in the digital VTR 102. Description is made of the operation at the time of recording of the image signal processing circuit.

At the time of recording, an analog image signal fed from the monitoring camera 101 is converted into digital image data by a decoder 11. The image data obtained by the decoder 11 is fed to a difference block 12. The difference block 12 comprises a memory 31 and addition/subtraction means 32. The memory 31 is controlled by a first FPGA (Field Programmable Gate Array) 13.

Figure 3:
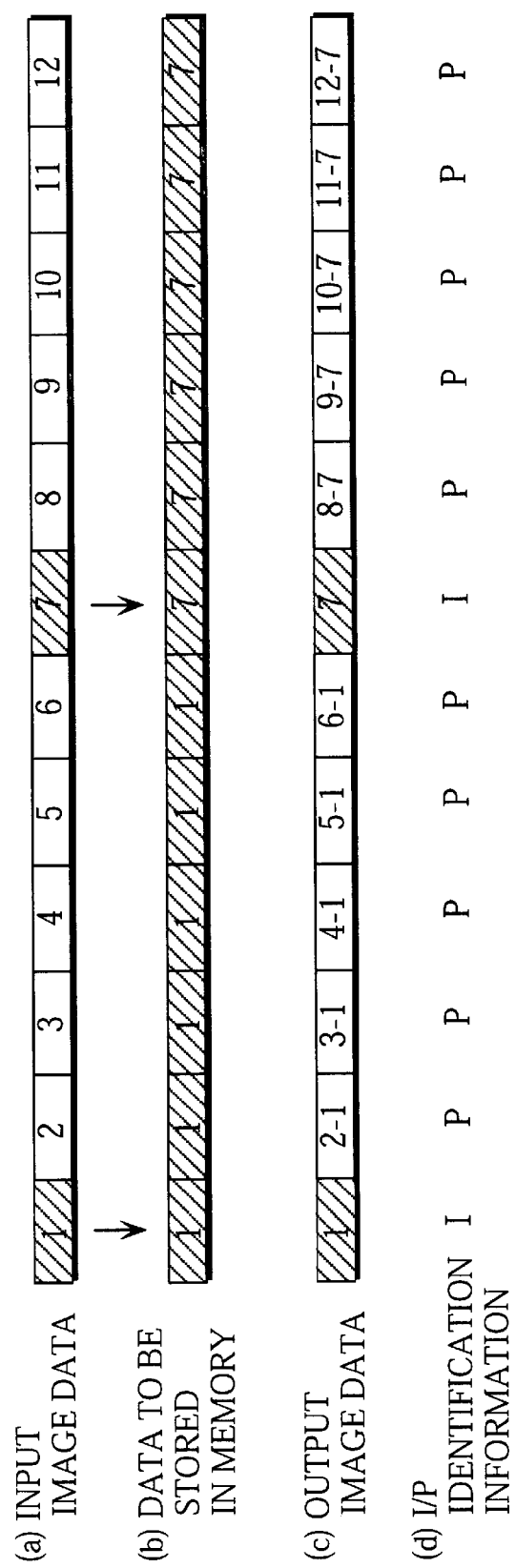
FIG. 3 is a timing chart showing the operation at the time of recording of a difference block.

FIG. 3 illustrates the operation at the time of recording of the difference block 12. In FIG. 3, a reference numeral denotes a field number.

The first FPGA 13 stores the image data outputted from the decoder 11 as basic image data in the memory 31 in a period of a predetermined number of fields (in this example, in a period of six vertical periods), and feeds the image data to an image compressing/expanding circuit 14 through the addition/subtraction means 32.

Each of the image data corresponding to the fields between the field corresponding to the image data which has been stored in the memory 31 and the field corresponding to the image data which is to be subsequently stored in the memory 31 is fed to the addition/subtraction means 32, the difference between the fed image data and the basic image data which is stored in the memory 31 is found, and data representing the found difference is fed to the image compressing/expanding circuit 14.

In the example shown in FIG. 3, image data "1" and "7" corresponding to field numbers "1" and "7" are stored in the memory 31, and are fed to the image compressing/expanding circuit 14. Each of image data "2" to "6" corresponding to field numbers between the field numbers "1" and "7" is fed to the addition/subtraction means 32, the difference between the fed image data and the basic image data "1" which is stored in the memory 31 is found, and data representing the found difference is fed to the image compressing/expanding circuit 14. Image data (basic image data) which has been fed to the image compressing/expanding circuit 14 through the addition/subtraction means 32 is called I image data, and data (difference data) which has been fed to the image compressing/expanding circuit 14 after the difference thereof from the basic image data was found by the addition/subtraction means 32 is called P image data.

In the image compressing/expanding circuit 14, the image data fed from the difference block 12 is compressed by a JPEG (Joint Photographic Experts Group) system, for example, for each field. Compressed image data (coded data) obtained by the image compressing/expanding circuit 14 is fed to additional information adding/separating unit 15.

On the other hand, a microcomputer 40 acquires, from the first FPGA 13, I/P identification information indicating whether the compressed image data fed to the additional information adding/separating unit 15 corresponds to an I image or a P image, and feeds the acquired I/P identification information, together with recording time information (information relating to the current year, month, day, minute, and second) and the like, to the additional information adding/separating unit 15.

In the additional information adding/separating unit 15, additional information such as the I/P identification information and the recording time information which corresponds to the compressed image data fed from the microcomputer 40 is added to the compressed image data obtained by the image compressing/expanding circuit 14. The data to which predetermined data has been added by the additional information adding/separating unit 15 is fed to a second FPGA 16.

The second FPGA 16 alternately writes the data fed from the additional information adding/separating unit 15 in two memories 17 and 18 for each predetermined block including data corresponding to a plurality of fields, reads out, every time data corresponding to one block are written into the memory, the data from the memory into which the data corresponding to one block have been written, and feeds the data read out to a formatter 19. One block is composed of data corresponding to 288 tracks, including information relating to an audio in this example.

Specifically, the second FPGA 16 writes the data fed from the additional information adding/separating unit 15 into one of the memories, for example, the first memory 17. When the data corresponding to one block have been written into the first memory 17, the memory into which the data are to be written is switched to the other second memory 18 and at the same time, the reading of the data from the first memory 17 is started.

The data read out of the first memory 17 is fed to the formatter 19. When the data corresponding to one block have been read out of the first memory 17, the reading is stopped.

Thereafter, when the data corresponding to one block have been written into the second memory 18, the memory into which the data are to be written is switched to the first memory 17 and at the same time, the reading of the data from the second memory 18 is started. The data read out of the second memory 18 is fed to the formatter 19. When the data corresponding to one block have been read out of the second memory 18, the reading is stopped. Thereafter, the same processing is repeated.

In the formatter 19, the fed data is converted into data having a data structure which can be recorded on a video tape. The data obtained by the formatter 19 is recorded on the video tape through a recording amplifier and a video head inside a signal recording/reproducing unit 20. That is, image data are recorded basically for each block (corresponding to 288 tracks) on the video tape. Every time the recording of the data for each block is terminated, the video tape is stopped.

The second FPGA 16 and the formatter 19 are controlled by the microcomputer 40.

Figure 4:
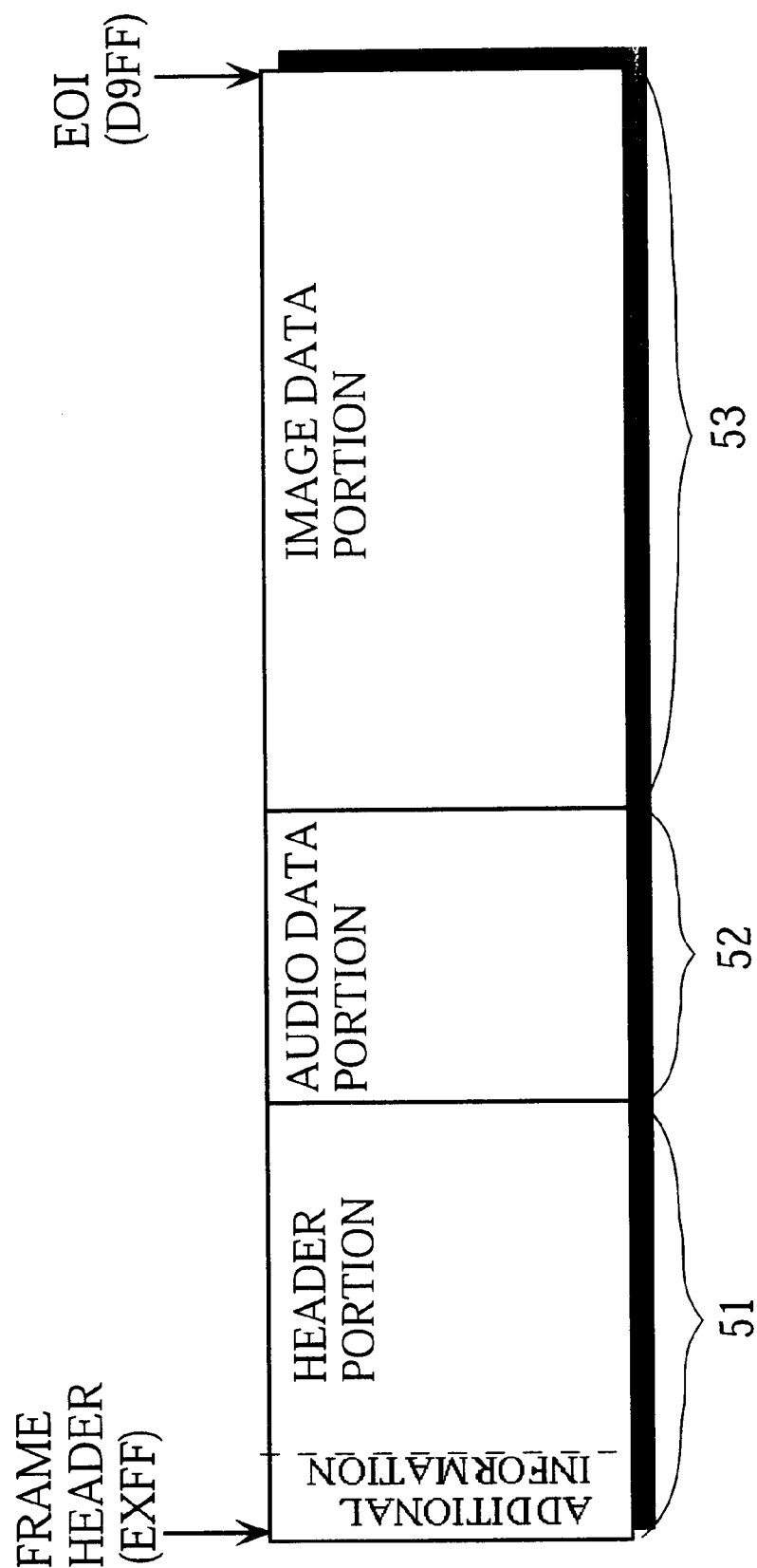
FIG. 4 is a schematic view showing a format for data corresponding to one field recorded on a video tape.

FIG. 4 illustrates a format for data corresponding to one field which is recorded on the video tape.

A data block corresponding to one field comprises a header portion 51, an audio data portion 52, and an image data portion 53.

The header portion 51 includes additional information such as I/P identification information and recording time information (year, month, day, hour, minute, and second), a quantization table (Q table), voice added data, and so forth. An example of the I/P identification information is "EXFFh", which is inserted as a frame header into the head of the header portion 51. "h" in "EXFFh" indicates that "EXFF" is a hexadecimal number. An image in the image data portion 53 is an I image if "X" in "EXFF" is zero, while being a P image if it is one. An end code (EOI; for example, "D9FFh") indicating the end of the image data portion 53 is inserted into the end of the image data portion 53.

[3] Description of Video Head Clogging Check Performed at the Time of Recording

As described above, at the time of recording, every time data corresponding to one block are written into the video tape, the video tape is stopped. However, a video head clogging check is performed utilizing a time period during which the video tape is stopped. Description is now made of a case where two video heads are provided opposite to each other through an angle of 180° in a recording drum.

Figure 5:
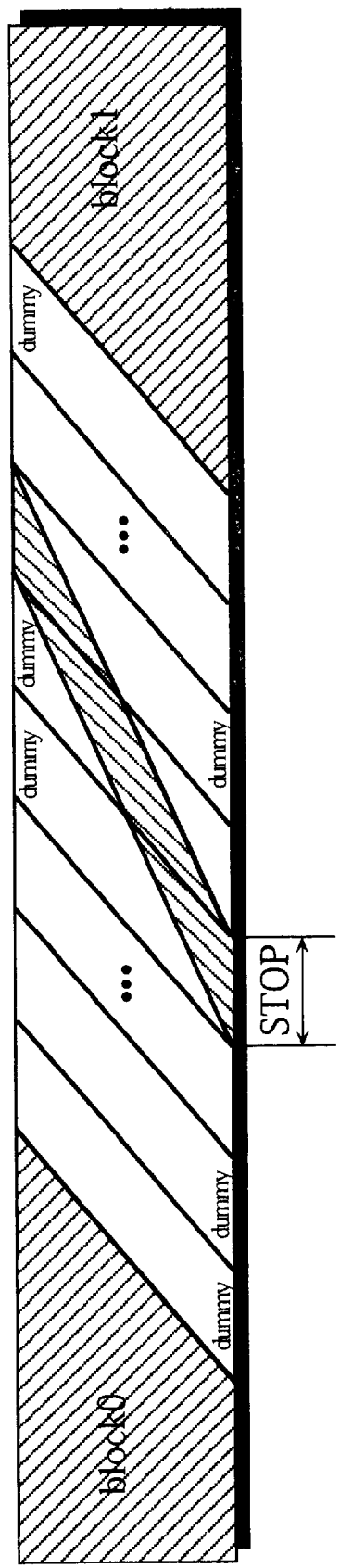
FIG. 5 is a schematic view showing the timing of performing a head clogging check.

As shown in FIG. 5, when data corresponding to one block (data corresponding to block0 in FIG. 5) are recorded on the video tape, dummy data corresponding to six tracks are recorded, and the video tape is then stopped. A check for clogging of each of the video heads is performed in the stopped state. When the clogging check is terminated, the video tape is caused to wait, allowing slight slack, by rotating a capstan in the opposite direction by only a predetermined amount in order to prevent the video tape from being damaged. Thereafter, at the timing of recording data corresponding to the subsequent block (data corresponding to block1 in FIG. 5), dummy data corresponding to a predetermined number of tracks are first recorded, and the recording of the data corresponding to the subsequent block on the video tape is then started.

Figure 6:
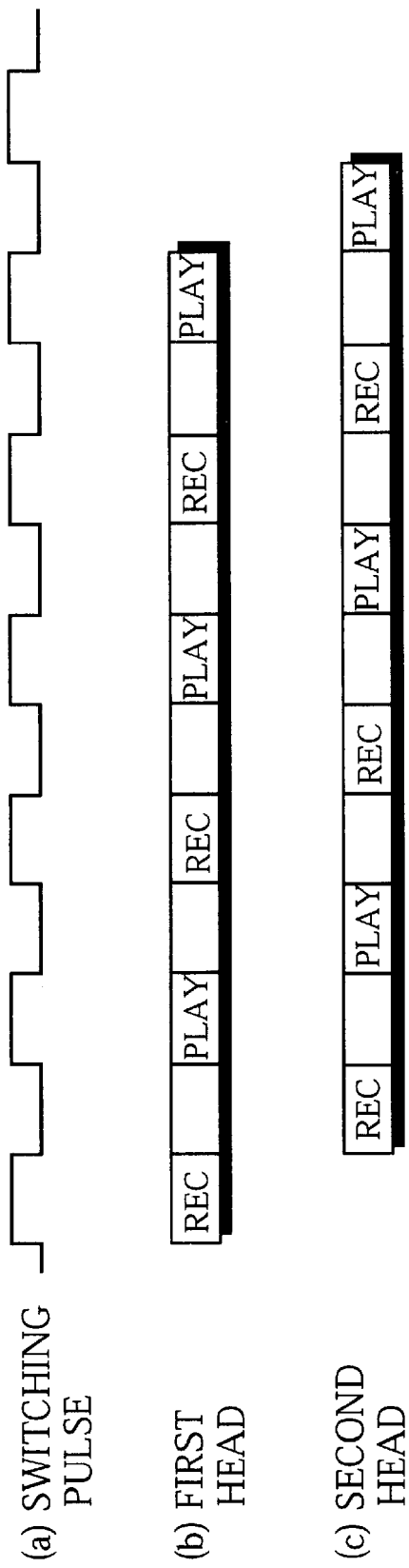
FIG. 6 is a timing chart for explaining a head clogging check performed when a video tape is stopped.

The check for clogging of each of the video heads is performed in the following manner. As shown in FIG. 6, recording and play of a test pattern are performed three times per head in a state where the video tape is stopped. The recording timing and the play timing of the test pattern for each of the video heads are controlled on the basis of a switching pulse, as shown in FIG. 6.

The microcomputer 40 calculates the sum of head outputs at the time of play performed three times for each of the video heads, and judges, when the sum is not more than a predetermined value (for example, not more than one-fourth a normal value) that the video head is clogged. The microcomputer 40 stops, when it judges that either one of the video heads is clogged, recording, and reports that the recording is stopped.

[4] Description of Operation at the Time of Play of Image Signal Processing Circuit At the time of play, data are read for each block from the video tape by the video head inside the signal recording/reproducing unit 20. The read image data are fed to the second FPGA 16 through a reproducing amplifier inside the signal recording/reproducing unit 20 and the formatter 19.

The second FPGA 16 alternately writes the fed data into the two memories 17 and 18 for each block, reads out, every time the data corresponding to one block are written into the memory, the data from the memory into which the data corresponding to one block have been written, and feeds the data read out to the additional information adding/separating unit 15.

The second FPGA 16 produces, when it writes the data fed from the formatter 19 into the memories 17 and 18, a sub-bank representing an address in which a frame header at the head of data corresponding to each field is stored is prepared in the memory, as shown in FIG. 7, such that a data write address can be recognized for the field.

In the additional information adding/separating unit 15, the additional information such as I/P identification information and time information is separated from the fed data corresponding to one field. The data from which the additional information has been separated is fed to the first FPGA 13 through the microcomputer 40.

The data from which predetermined data has been separated by the additional information adding/separating unit 15 is expanded for each field upon being fed to the image compressing/expanding circuit 14. Image data obtained by the image compressing/expanding circuit 14 is fed to the difference block 12.

Figure 8:
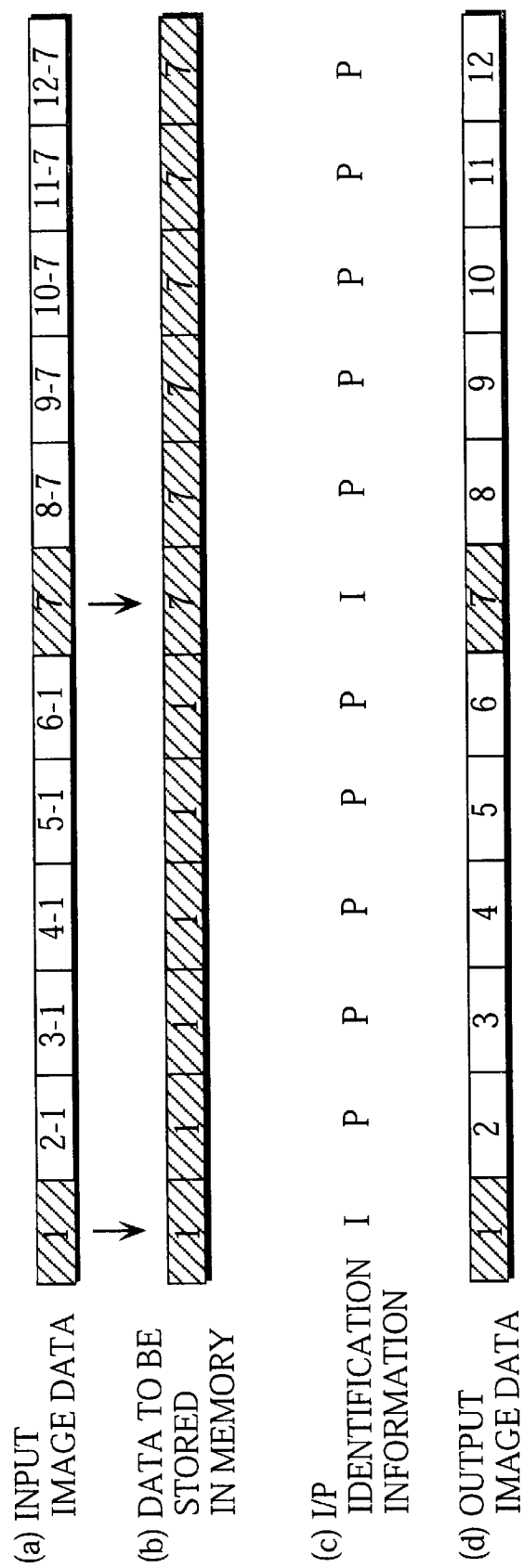
FIG. 8 is a timing chart showing the operation at the time of play of a difference block.

FIG. 8 illustrates the operation at the time of play of the difference block 12.

The first FPGA 13 judges whether an image inputted to the difference block 12 is an I image or a P image on the basis of the I/P identification information fed from the microcomputer 40.

When the image inputted to the difference block 12 is the I image, image data representing the I image is stored in the I memory 31, and is fed to an encoder 21 through the addition/subtraction means 32. When the image inputted to the difference block 12 is the P image, data representing the P image (difference data) is fed to the addition/subtraction means 32, to find the sum of the P image data and the I image data (basic image data) which has been most newly stored in the memory 31. Obtained image data is fed to the encoder 21.

In the example shown in FIG. 8, I image data "1" and "7" are stored in the memory 31, and are fed to the encoder 21. Further, each of P image data "2-1", "3-1", . . . "6-1", "8-7", etc. is added to the I image data which has been most newly stored in the memory 31, to be returned to its original image data. Thereafter, the original image data is then fed to the encoder 21.

In the encoder 21, the fed image data is returned to an analog image signal, and the analog image signal is then fed to the monitor 103.

[5] Description of Special Play

[5-1] Description of Operations at the Time of Reverse Play

Description is made of operations in a case where a reverse play command is entered into the microcomputer 40 while normal play is being performed.

In the following description, an I/P group shall refer to a group comprising an arbitrary I image and P images whose difference from the I image is found.

At the time point where the reverse play command is entered into the microcomputer 40, data corresponding to one block (288 tracks) which have been normally reproduced immediately before the time point are stored in the first memory 17 or the second memory 18. The I image in the I/P group which has been reproduced immediately before the time point where the reverse play command is entered into the microcomputer 40 is stored in the memory 31 in the difference block 12.

For convenience of illustration, it is assumed that at the time point where the data corresponding to 12 fields corresponding to the index numbers 1 to 12 in the sub-bank (see FIG. 7) are normally reproduced, as shown in FIG. 9, out of the data corresponding to one block stored in the first memory 17, the reverse play command is entered into the microcomputer 40 In FIG. 9, I indicates an I image, and P indicates a P image. I1 and P11, P12 and P13 constitute the same I/P group, I2 and P21, P22 and P23 constitute the same I/P group, and I3 and P31, P32 and P33 constitute the same I/P group.

At the time of reverse play, the data corresponding to the index numbers 12, 11, 10, . . . 2, 1 must be reproduced in this order. In each of the I/P groups, however, the P image cannot be reproduced unless the I image is previously reproduced. At the time of reverse play, the second FPGA 16, the microcomputer 40, and the first FPGA 13 carry out the following control.

① The I/P group (I3, P31, P32, P33) which should be first reproduced is first reproduced by reverse play. Specifically, when the reverse play command is entered, the I image (I3) corresponding to the index number 9 is stored in the memory 31 in the difference block 12. Accordingly, the P images P33, P32, and P31 are reproduced in this order on the basis of the I image I3 stored in the memory 31. Thereafter, the I image I3 is reproduced. Consequently, the image data corresponding to the index numbers 12 to 9 are reproduced in the opposite direction.

② Only respective additional information in the image data corresponding to the index numbers 8 to 5 are reproduced in the order of decreasing number, to acquire the index number 5 corresponding to the I image I2 in the I/P group (I2, P21, P22, P23) which should be subsequently reproduced on the basis of I/P identification information included in the additional information.

③ The I image (I2) corresponding to the index number 5 is reproduced. Consequently, the reproduced I image (I2) is stored in the memory 31 in the difference block 12. However, the reproduced I image is controlled so as not to be outputted from the difference block 12.

④ The I/P group (I2, P21, P22, P23) composed of the image data corresponding to the index numbers 5 to 8 is reproduced by reverse play, as in the item ①. ⑤ Only respective additional information in the image data corresponding to the index numbers 4 to 1 are reproduced in the order of decreasing number, to acquire the index number 1 corresponding to the I image I1 in the I/P group (I1 P11, P12, P13) which should be subsequently reproduced on the basis of I/P identification information included in the additional information.

⑥ The I image (I1) corresponding to the index number 1 is reproduced. Consequently, the reproduced I image (I1) is stored in the memory 31 in the difference block 12. However, the reproduced I image is controlled so as not to be outputted from the difference block 12.

⑦ The 1/P group (I1, P11, P12, P13) composed of the image data corresponding to the index numbers 1 to 4 is reproduced by reverse play, as in the item ①. In the above-mentioned manner, the data which has been normally reproduced at the time point where the reverse play command is entered into the microcomputer 40 and the preceding data out of the data corresponding to one block which have been normally reproduced at the time point where the reverse play command is entered into the microcomputer 40 are reproduced in the opposite direction.

At the time of reverse play, the data are read for each block in the order reverse to the order recorded, contrary to that at the time of normal play. When data in the block preceding the block including the data which have been reproduced in the opposite direction in the above-mentioned manner are stored in the memory different from the memory in which the data which have been reproduced in the opposite direction are stored out of the memories 17 and 18, the data in the block are reproduced in the opposite direction by the same processing as the processing in the item ② and the subsequent items.

[5-2] Description of Operations at the Time of Forward Play

At the time of forward play, data read from the video tape are alternately stored for each block in the memories 17 and 18, as at the time of normal play. At the time of forward play, however, only data corresponding to the I image out of the data stored in the memories 17 and 18 are read out and are reproduced.

[5-3] Description of Operations at the Time of Rewind Play

At the time of rewind play, data read out of the video tape are alternately stored for each block in the memories 17 and 18, as at the time of reverse play. At the time of rewind play, however, only data corresponding to the I image out of the data stored in the memories 17 and 18 are read out in the opposite direction and are reproduced.

[6] Description of Retrieval Processing by Designation of Recording Time

Description is now made of retrieval processing for designating recording time to reproduce an image recorded at the designated recording time.

At the time of data recording, for each recording block, recording time (year, month, day, minute, and second) at the head of the recording block is written as VASS data into the control track of the video tape.

Figure 10:
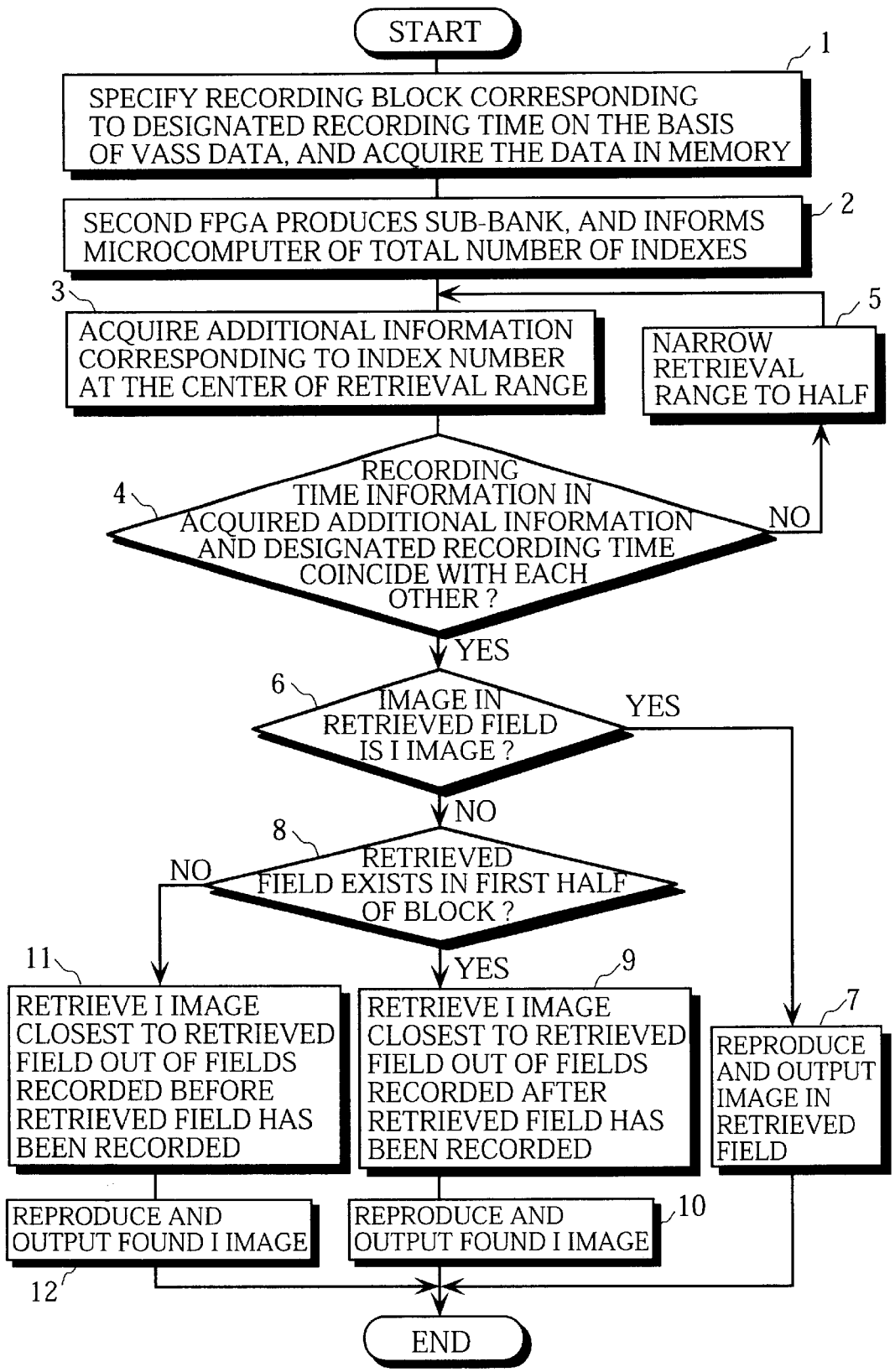
FIG. 10 is a flow chart showing the procedure for retrieval processing by designation of recording time.

FIG. 10 shows the procedure for operations at the time of retrieval.

A recording block corresponding to designated recording time is first specified on the basis of VASS data written into the control track, and data corresponding to the recording block are acquired in the memory 17 (step 1).

That is, the microcomputer 40 acquires the VASS data from the control track while forwarding the video tape. When the VASS data which has been acquired after the designated recording time is detected, the video tape is rewound by one block, and a play operation is then performed, to acquire in the memory 17 data corresponding to a recording block preceding the recording block corresponding to the VASS data which has been acquired after the designated recording time.

The second FPGA 16 produces in the memory 17 a sub-bank (see FIG. 7) representing an address in which a frame header at the head of data corresponding to each field is stored when the data corresponding to the specified recording block is acquired in the memory 17. The microcomputer 40 is informed of the total number of indexes (step 2). The microcomputer 49 and the second FPGA 16 start binary search.

That is, the microcomputer 40 first instructs the second FPGA 16 to give the index number at the center of a retrieval range and acquire additional information, to acquire the additional information corresponding to the index number at the center of the retrieval range (step 3). Immediately after the binary search, the retrieval range becomes all fields (all indexes) inside the recording block specified at the foregoing step 1.

It is judged whether or not recording time information, corresponding to the field, included in the acquired additional information and the designated recording time coincide with each other (step 4). When they do not coincide with each other, it is judged whether a field to be an object precedes or succeeds the field corresponding to the acquired additional information, and the retrieval range is narrowed to half by the result of the judgment (step 5). Thereafter, the program is returned to the step 3. The processing at the step 3 and the subsequent steps is performed.

The binary search at the steps 3 to 5 is repeatedly performed, thereby retrieving the field corresponding to the additional information including the same time as the designated recording time. When the field corresponding to the additional information including the same time as the designated recording time can be retrieved (YES at step 4), the microcomputer 40 judges whether the image in the field retrieved at the step 4 is an I image or a P image on the basis of I/P identification information included in the additional information corresponding to the retrieved field (step 6).

When the image in the field retrieved at the step 4 is an I image, the microcomputer 40 instructs the second FPGA 16 to output data representing the I image in the retrieved field (step 7). Consequently, the data corresponding to the retrieved field is reproduced and outputted.

When it is judged at the step 6 that the image in the field retrieved at the step 4 is a P image, the microcomputer 40 judges whether the retrieved field exists in the first half or the latter half of the block on the basis of the index number corresponding to the retrieved field (step 8).

When the field retrieved at the step 4 exists in the first half of the block, the microcomputer 40 successively acquires the additional information in the direction in which the index number increases, to retrieve the field including an I image which is closest to the retrieved field out of the fields recorded after the retrieved field has been recorded (step 9) The reason why the I image is retrieved in the direction in which the index number increases is that no I image may exist in the fields preceding the retrieved field in the block.

When the I image is found at the step 9, the second FPGA 16 is instructed to output data representing the found I image (step 10). Consequently, an I image in the field closest to the field retrieved at the step 4 out of the fields recorded after the retrieved field has been recorded is reproduced and outputted.

When the field retrieved at the step 4 exists in the latter half of the block, the microcomputer 40 successively acquires the additional information in the direction in which the index number decreases, to retrieve the field including an I image which is closest to the retrieved field out of the fields recorded before the retrieved field has been recorded (step 11). When the I image is found, the second FPGA 16 is instructed to output data representing the found I image (step 12). Consequently, an I image in the field closest to the field retrieved at the step 4 out of the fields recorded before the retrieved field has been recorded is reproduced and outputted.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. A retrieval method by designation of recording time in an image recording/reproducing apparatus for recording, at the time of recording, input image data or its compressed data on a video tape by adding recording time information for each block including data corresponding to a plurality of fields and for each field included in the block as well as recording for each block VASS data representing the recording time information at the head of the block on a control track of the video tape, comprising:

the first step of specifying, when recording time is designated in order to perform retrieval by designation of the recording time, a block corresponding to the designated recording time on the basis of the VASS data, and storing in a second memory data in the block;

the second step of retrieving, out of the plurality of fields included in the block stored in the second memory, the field having the recording time information corresponding to the designated recording time by binary search; and the third step of reproducing and outputting the data corresponding to the retrieved field.

2. A retrieval device by designation of recording time in an image recording/reproducing apparatus for recording, at the time of recording, input image data or its compressed data on a video tape by adding recording time information for each block including data corresponding to a plurality of fields and for the field included in the block as well as recording for each block VASS data representing the recording time information at the head of the block on a control track of the video tape, comprising:

first means for specifying, when recording time is designated in order to perform retrieval by designation of the recording time, a block corresponding to the designated recording time on the basis of the VASS data, and storing in a second memory data in the block;

second means for retrieving, out of the plurality of fields included in the block stored in the second memory, the field having recording time information corresponding to the designated recording time by binary search; and third means for reproducing and outputting the data corresponding to the retrieved field.

3. A retrieval method by designation of recording time in an image recording/reproducing apparatus for storing, at the time of recording, input image data as basic image data in a first memory in a period of a predetermined number of fields, finding, with respect to each of the input image data corresponding to the fields between the field corresponding to the input image data which has been stored in the first memory and the field corresponding to the input image data which is to be subsequently stored in the first memory, the difference between the input image data and the basic image data which has been most newly stored in the first memory to produce difference data, recording on a video tape the basic image data and the difference data or their compressed data by adding, for each block including data corresponding to the plurality of fields and for each field included in the block, identification information indicating whether the field corresponds to the basic image data or the difference data and recording time information, and recording for each block VASS data representing the recording time information at the head of the block on a control track of the video tape, comprising:

the first step of specifying, when recording time is designated in order to perform retrieval by designation of the recording time, the block corresponding to the designated recording time on the basis of the VASS data, and storing in a second memory data in the block;

the second step of retrieving, out of the plurality of fields included in the block stored in the second memory, the field having the recording time information corresponding to the designated recording time by binary search;

the third step of reproducing and outputting, when the retrieved field corresponds to the basic image data, the field; and the fourth step of reproducing and outputting, when the retrieved field corresponds to the difference data, the field, corresponding to the basic image data, close to the field retrieved in the block specified at the first step.

4. The retrieval method according to claim 3, wherein the fourth step comprises the steps of judging, when the retrieved field corresponds to the difference data, whether the field exists in the first half or the latter half of the block specified at the first step, reproducing and outputting, when it is judged that the retrieved field exists in the first half of the block specified at the first step, the field, corresponding to the basic image data, closest to the field retrieved out of the fields recorded after the retrieved field has been recorded, and reproducing and outputting, when it is judged that the retrieved field exists in the latter half of the block specified at the first step, the field, corresponding to the basic image data, closest to the retrieved field out of the fields recorded before the retrieved field has been recorded.

5. A retrieval device by designation of recording time in an image recording/reproducing apparatus for storing, at the time of recording, input image data as basic image data in a first memory in a period of a predetermined number of fields, finding, with respect to each of the input image data corresponding to the fields between the field corresponding to the input image data which has been stored in the first memory and the field corresponding to the input image data which is to be subsequently stored in the first memory, the difference between the input image data and the basic image data which has been most newly stored in the first memory to produce difference data, recording on a video tape the basic image data and the difference data or their compressed data by adding, for each block including data corresponding to the plurality of fields and for each field included in the block, identification information indicating whether the field corresponds to the basic image data or the difference data and recording time information, and recording for each block VASS data representing the recording time information at the head of the block on a control track of the video tape, comprising:

first means for specifying, when recording time is designated in order to perform retrieval by designation of the recording time, the block corresponding to the designated recording time on the basis of the VASS data, and storing in a second memory data in the block;

second means for retrieving, out of the plurality of fields included in the block stored in the second memory, the field having the recording time information corresponding to the designated recording time by binary search;

third means for reproducing and outputting, when the retrieved field corresponds to the basic image data, the field; and fourth means for reproducing and outputting, when the retrieved field corresponds to the difference data, the field, corresponding to the basic image data, close to the field retrieved in the block specified by the first means.

6. The retrieval device according to claim 5, wherein the fourth means comprises means for judging, when the retrieved field corresponds to the difference data, whether the field exists in the first half or the latter half of the block specified by the first means, means for reproducing and outputting, when it is judged that the retrieved field exists in the first half of the block specified by the first means, the field, corresponding to the basic image data, closest to the field retrieved out of the fields recorded after the retrieved field has been recorded, and means for reproducing and outputting, when it is judged that the retrieved field exists in the latter half of the block specified by the first means, the field, corresponding to the basic image data, closest to the retrieved field out of the fields recorded before the retrieved field has been recorded.

* * * * *